(12) United States Patent
Ajiro et al.

(10) Patent No.: US 6,376,587 B1
(45) Date of Patent: Apr. 23, 2002

(54) RUBBER COMPOSITION FOR TIRE TREAD AND PNEUMATIC TIRE USING SAID RUBBER COMPOSITION

(75) Inventors: Yukitoshi Ajiro, Kodaira; Kazuo Yagawa, Urawa, both of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/338,540

(22) Filed: Jun. 23, 1999

(30) Foreign Application Priority Data

Jun. 25, 1998 (JP) .......................................... 10-178887
May 6, 1999 (JP) .......................................... 11-126096

(51) Int. Cl.$^7$ ................................................ C08K 3/20
(52) U.S. Cl. ........................ 524/252; 524/265; 524/269; 524/496; 524/508
(58) Field of Search ................................. 524/252, 508, 524/265, 269, 496

(56) References Cited

U.S. PATENT DOCUMENTS 5,049,610 A * 9/1991 Takai et al. .................. 524/514

FOREIGN PATENT DOCUMENTS

| EP | 0 090 387 A | 10/1983 |
| EP | 0 814 123 A | 12/1997 |
| JP | 07 048476 A | 2/1995 |

* cited by examiner

Primary Examiner—Peter D. Mulcahy
(74) Attorney, Agent, or Firm—Sughrue Mion, PLLC

(57) ABSTRACT

A rubber composition for a tire tread comprising:
per 100 parts by weight of a diene based rubber component containing at least 50 parts by weight of SBR, 5 to 50 parts by weight of carbon black (C/B) having a nitrogen absorption surface area ($N_2SA$) of from 90 to 180 $m^2/g$ and a DBP absorption amount of from 100 to 170 ml/100 g and 5 to 50 parts by weight of silica (S), wherein the total amount of (C/B+S) is from 30 to 90 parts by weight; and 5 to 20% by weight of a silane coupling agent relative to the blended amount of silica; 1 to 15 parts by weight of a thermoplastic (novolac type) phenol resin; and 5 to 20% by weight of hexamethylenetetramine relative to the blended amount of resin, wherein tan δ at 60° C., tan δ at 0° C., dynamic modulus E' at 30° C., and tensile stress at the time of extending 300% (M300) at 25° C. of the rubber composition are tan δ (60° C.)≦0.14, tan δ (0° C.)≧0.50, E' (30° C.)≧1.2×10$^7$ pa and M300 (25° C.)≦9.5 Mpa, respectively, and a pneumatic tire using the rubber composition.

12 Claims, No Drawings

RUBBER COMPOSITION FOR TIRE TREAD AND PNEUMATIC TIRE USING SAID RUBBER COMPOSITION

BACKGROUND OF THE INVENTION (1) Field of the Invention

The present invention relates to a rubber composition for a tire tread which can reduce rolling resistance (RR) to improve the fuel consumption without impairing the braking performance and the turning performance of an automobile on a wet (WET) road surface, and a pneumatic tire using said rubber composition.

(2) Description of the Prior Art

Recently, the fuel consumption of automobiles has been highlighted as an environmental problem due to the exhaust gas control of automobiles.

To improve the fuel consumption, it is known that reduction of the rolling resistance is effective. A main factor of the rolling resistance is the internal friction of a material forming a tire, and the internal friction of respective parts such as a tread, a side wall, a carcass and an inner liner can be involved. Among them, a tread is most contributive. Therefore, it is most effective for the reduction of the rolling resistance to reduce a strain energy loss due to compression of the compounded rubber for a tread, bending shear and the like.

Since the rolling resistance correlates largely with a loss tangent (tan δ) at 60° C., it is necessary to decrease this value of the rubber composition for improving the fuel consumption.

Heretofore, as the technique for decreasing tan δ at 60° C., for example, attention is given to carbon black as a reinforcing agent which is blended in a rubber composition for a tread, and there have been known such methods that carbon black to be blended is simply reduced, or that the grade of carbon black to be used is lowered, that is, carbon black having a large particle diameter, for example, the one having a nitrogen absorption specific surface area ($N_2SA$) of about 90 $m^2/g$ is used.

In addition to this, improvement of polymers has been tried. Considering other performance required for a tire, however, satisfactory effects have not always been obtained with these combinations.

Furthermore, there can be combined a method in which silica or a silane coupling agent are used together in the reinforcing agent to be blended and they are used in an amount of from 0 to 100% by weight relative to the total amount of the reinforcing agent. However, it is not a satisfactory level for all the required performance.

On the other hand, there has been conventionally known a rubber composition for a tire tread in which carbon black and silica are blended in a specific amount per 100 parts by weight of diene based rubber components containing styrene-butadiene rubber so that tan δ (at 60° C.) is sufficiently lowered to reduce the rolling resistance, and tan δ (at 0° C.) becomes adequately large to improve wettability. However, a recent higher level requirement for braking and turning performance cannot be satisfied with such formation. In this case, the problems are present in block rigidity and a contact area, and there is a problem that if they are not secured sufficiently, the braking and turning performance peculiar to the composition cannot be exerted.

To secure the block rigidity, the dynamic modulus (E') has to be increased. To increase E', the reinforcing agent is increased, or the crosslinking density is increased. However, the increase of the reinforcing agent has a problem that it unnecessarily increases tan δ (60° C.) to make the rolling resistance worse. Moreover, the increase of the crosslinking density increases the tensile stress (M300, RT: under room temperature). As a result, there are such problems that a pressure at the contact surface between the tread and a road is not uniform and thus satisfactory braking and turning performance is not exerted.

SUMMARY OF THE INVENTION

With a view to solving the above problems, an object of the present invention is to provide a rubber composition for a tire tread which can reduce the rolling resistance (RR) to improve the fuel consumption without impairing the braking performance and the turning performance of an automobile on a wet road surface, and a pneumatic tire using said rubber composition.

The present inventor made an intensive investigation on the above described problems, and succeeded in obtaining the intended rubber composition for a tire tread and a pneumatic tire using said rubber composition, by blending a specific resin and the like as well as a specific rubber component, carbon black and silica in a specific amount to form a rubber composition and by specifying characteristic values of the rubber composition.

Namely, the present invention comprises the following constitutions (1) to (2):

(1) a rubber composition for a tire tread comprising: per 100 parts by weight of a diene based rubber component containing at least 50 parts by weight of styrene-butadiene rubber,
  a) 5 to 50 parts by weight of carbon black having a nitrogen absorption surface area ($N_2SA$) of from 90 to 180 $m^2/g$ and an oil-absorbing amount of dibutylphthalate (DBP) of from 100 to 170 ml/100 g;
  b) 5 to 50 parts by weight of silica,
  c) wherein the total amount of said carbon black and silica is from 30 to 90 parts by weight; and
  d) 5 to 20% by weight of a silane coupling agent relative to the blended amount of silica;
  e) 1 to 15 parts by weight of a thermoplastic (novolac type) phenol resin; and
  f) 5 to 20% by weight of hexamethylenetetramine relative to the blended amount of resin, wherein tan δ at 60° C., tan δ at 0° C., dynamic modulus E' at 30° C., and tensile stress at the time of extending 300% (M300) at 25° C. of the rubber composition are tan δ (60° C.)$\leq$0.14, tan δ (0° C.)$\geq$0.50, dynamic modulus E' (30° C.)$\geq$1.2×$10^7$ pa and tensile stress at the time of extending 300% (M300) (25° C.)$\leq$9.5 Mpa, respectively;

(2) a rubber composition for a tire tread as described in the above item (1), wherein the styrene-butadiene rubber is a solution polymerized styrene-butadiene rubber;

(3) a rubber composition for a tire tread as described in the above item (1), wherein the nitrogen absorption surface area ($N_2SA$) of carbon black is from 100 to 140 $m^2/g$ and the oil-absorbing amount of dibutylphthalate (DBP) is from 110 to 150 ml/100 g;

(4) a rubber composition for a tire tread as described in the above item (1), wherein the nitrogen absorption surface area ($N_2SA$) of silica is from 100 to 300 $m^2/g$;

(5) a rubber composition for a tire tread as described in the above item (1), wherein the thermoplastic (novolac type) phenol resin is an alkyl-substituted phenol resin;

(6) a rubber composition for a tire tread as described in the above item (1), wherein the thermoplastic (novolac type) phenol resin is an oil-modified phenol resin; and (7) a pneumatic tire using the rubber composition for a tire tread as described in any of the above items (1) to (6) for at least a portion of the tread rubber which is brought into contact with the road surface.

According to the present invention, there are provided a rubber composition for a tire tread which can reduce rolling resistance (RR) to improve the fuel consumption without impairing the braking performance and the turning performance of an automobile on a wet road surface, and a pneumatic tire using the rubber composition.

DETAILED DESCRIPTION OF THE PREFERRED EMBODIMENT

An embodiment of the present invention will now be described in detail.

As the rubber component used for the rubber composition for a tire tread (hereinafter referred to as "rubber composition") of the present invention, it has to be a diene based rubber component containing at least 50 parts by weight of styrene-butadiene rubber (SBR) per 100 parts by weight of the whole rubber component.

In the present invention, the reason why SBR is contained in an amount of at least 50 parts by weight per 100 parts by weight of the whole rubber component is to attain excellent WET braking performance and turning performance by obtaining desired grip force. If the SBR is outside the above-mentioned range, that is, less than 50 parts by weight, the desired grip force cannot be obtained, hence the WET braking performance and the turning performance would be inferior.

Moreover, among SBR, molecular-designed solution polymerized SBR is particularly effective in view of improving the above-mentioned WET braking and turning performance.

Furthermore, the rubber components other than the above-mentioned SBR which can be used in the present invention are not particularly limited, so long as they are a diene based rubber, and there can be given, for example, chloropyrene rubber (CR), acrylonitrile butadiene rubber (NBR), butadiene rubber (BR), isoprene rubber (IR) and natural rubber (NR).

These rubber components other than the SBR can be used singly or in a combination of two or more of them.

Carbon black used for the rubber composition of the present invention includes carbon black having a nitrogen absorption surface area ($N_2SA$) of from 90 to 180 $m^2/g$, preferably from 100 to 140 $m^2/g$ and an oil-absorbing amount of dibutylphthalate (DBP) of from 100 to 170 ml/100 g, preferably from 110 to 150 ml/100 g, and specifically, carbon black having a quality in conformity with ASTM N339, N234, N110, etc.

The blending amount of carbon black is from 5 to 50 parts by weight per 100 parts by weight of the above-mentioned rubber component.

Silica used for the rubber composition of the present invention is not particularly limited and includes silica having a nitrogen absorption surface area ($N_2SA$) of from 100 to 300 $m^2/g$, preferably from 150 to 250 $m^2/g$.

As for silica, synthetic silica prepared by means of sedimentation method is used. Specifically, there can be given "Nipsil AQ" manufactured by Nippon Silica Kogyo K.K., "ULTRASIL VN3" and "BV3370GR" manufactured by Degssa AG. in Germany, "RP1165MP", "Zeosil 165GR" and "Zeosil 175VP" manufactured by Rhone Poulenc Co., "Hisil 233", "Hisil 210" and "Hisil 255" manufactured by PPG Co. (either of them is a brand name).

The blending amount of silica is from 5 to 50 parts by weight per 100 parts by weight of the above-mentioned rubber component.

Moreover, in the present invention, the total blending amount of carbon black and silica is from 30 to 90 parts by weight, preferably from 45 to 70 parts by weight per 100 parts by weight of the above-mentioned rubber component.

By blending the above mentioned carbon black and silica in a total amount of from 30 to 90 parts by weight, excellent WET braking performance and turning performance can be attained.

If the above-mentioned total amount is less than 30 parts by weight, the intended WET braking performance, turning performance and durability such as wear resistance, irregular wear resistance and the like cannot be attained. If the above-mentioned total amount is larger than 90 parts by weight, the tire becomes hard and too brittle, which is not desirable.

Furthermore, in the present invention, it is necessary to use a silane coupling agent which can strengthen the coupling force between silica and the rubber composition and improve the wear resistance. The blending amount of said silane coupling agent is desirably from 5 to 20% by weight, preferably from 7.5 to 12.5% by weight relative to the amount of silica.

The silane coupling agent which can be used in the present invention is not particularly limited, and includes, for example, bis(3-triethoxysilylpropyl)polysulfide, bis(3-triethoxysilylpropyl)tetrasulfide, γ-mercaptopropyl trimethoxysilane, γ-mercaptopropyl triethoxysilane, γ-aminopropyl trimethoxysilane, γ-aminopropyl triethoxysilane, vinyltrimethoxysilane, vinyltriethoxysilane, γ-glycidoxypropyl trimethoxysilane, γ-glycidoxypropylmethyl diethoxysilane, 3-trimethoxysilylpropyl-N, N-dimethylcarbamoyl tetrasulfide, 3-trimethoxysilylpropyl benzothiazolyl tetrasulfide, and 3-trimethoxysilylpropylmethacrylate monosulfide.

If the blending amount of the silane coupling agent is less than 5% by weight, the effect of blending silica is not exerted, and even if the blending amount of the silane coupling agent is larger than 20% by weight, the effect of blending the silane coupling agent is not so much improved, but the cost thereof increases, which is not desirable.

The resin used for the rubber composition of the present invention is blended to obtain a rubber composition having the intended physical properties. Specifically, it is blended to improve the dynamic modulus E' while keeping tan δ low, and not to increase M300 more than being required. A thermoplastic (novolac type) phenol resin described below can be given as examples.

The thermoplastic (novolac type) phenol resin used in the present invention is a solid resin having a melting point of from 50 to 120° C. which is obtained by condensation polymerization of phenol or a modified phenol and formaldehyde, usually in a range of from 0.6 to 1.0 in a molar ratio (F/P) of formaldehyde (F) to phenol (P).

Specific thermoplastic (novolac type) phenol resins include, for example, a straight phenol resin, an alkyl-substituted phenol resin and an oil-modified phenol resin.

The main component of the straight phenol resin is expressed by the following formula (I):

Straight Phenol Resin

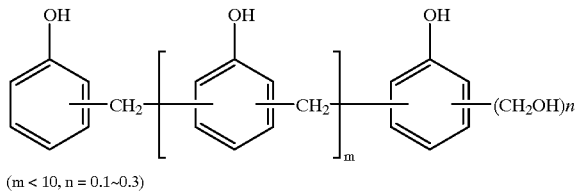

(I)

(m < 10, n = 0.1~0.3)

Phenol Resin Modified with a Terpene

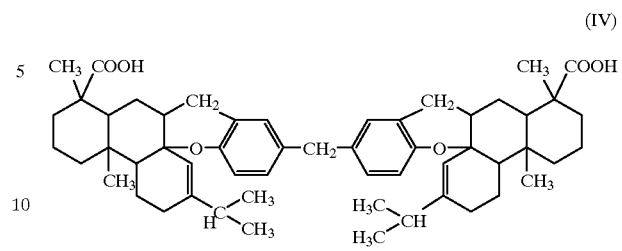

(IV)

Moreover, in the case of an alkyl-substituted phenol resin, it is a phenol resin in which alkyl groups are substituted for at least one part of the aromatic rings in the above formula (I).

The oil-modified phenol resin is a phenol resin in which an oil component is introduced as a modification species to improve the miscibility of the phenol resin to the rubber composition, particularly, a nonpolar diene based rubber composition.

As the modification species, for example, there can be given resorcin, cresol, octyl phenol, nonyl phenol and other alkyl phenols, phenyl phenol, butyl phenol, cashew oil, aromatic hydrocarbon resins, alkyl benzenes, melamines, terpenes, furans, and the like.

Moreover, as the method of modification, there can be given substitution to aromatic rings of the phenol resin, copolycondensation of formalin and phenol or an oil-modified phenol, or copolycondensation of formalin and an oil-modification species and phenol.

As a preferable thermoplastic (novolac type) phenol resins, alkyl-substituted phenol resins, oil-modified phenol resins are desirable from a stand point of miscibility with diene based rubbers.

Among them, as a particularly preferable oil-modified phenol resin, there can be exemplified a phenol resin modified with cashew oil expressed by the following formula (II), a phenol resin modified with an aromatic hydrocarbon expressed by the following formula (III), and a phenol resin modified with a terpene expressed by the following formula (IV).

Phenol Resin Modified with Cashew Oil

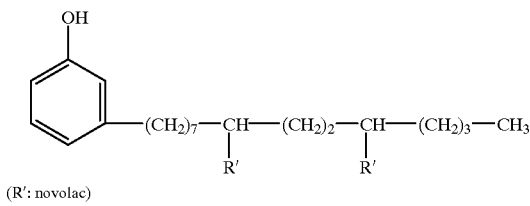

(II)

(R': novolac)

Phenol Resin Modified with an Aromatic Hydrocarbon

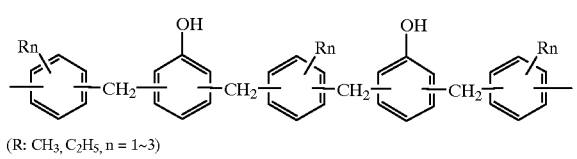

(III)

(R: $CH_3$, $C_2H_5$, n = 1~3)

Specifically, as a straight phenol resin, for example, there can be given "Sumilite Resin No. PR-50731 (melting point: 95° C.) (manufactured by Sumitomo Bakelite, to be repeated in the followings), and as an alkyl substituted phenol resin, there can be given "Sumilite Resin No. PR-19900 (melting point: 80° C.). As a cashew modified phenol resin, there can be given "Sumilite Resin No. PR-12686 (melting point: 70° C.), and as an oil modified phenol resin, there can be given "PR-13349 (melting point: 73° C.).

The blending amount of the above-mentioned thermoplastic phenol resin is from 1 to 15 parts by weight, preferably from 2 to 5 parts by weight, per 100 parts by weight of the above-mentioned rubber composition.

If the blending amount of the resin is less than 1 parts by weight, a rubber composition having the intended physical properties can be hardly obtained, and if the blending amount of the resin is larger than 15 parts by weight, there is a misgiving about durability, which is not preferable.

Moreover, in the present invention, it is necessary to use hexamethylenetetramine which can cure the resin to attain the intended physical properties, and the blending amount of hexamethylenetetramine is desirably from 5 to 20% by weight, preferably from 7.5 to 12.5% by weight, relative to the amount of the resin.

If the blending amount of hexamethylenetetramine is less than 5% by weight, the degree of curing is insufficient, and if the blending amount of hexamethylenetetramine exceeds 20% by weight, the effect of curing cannot be so much exerted, with only a negative effect of the increased cost of the raw material given, which is not desirable.

In the present invention, furthermore, chemicals for rubbers normally used in the rubber industry, such as antioxidants, softeners, vulcanizing agents, vulcanization accelerators, accelerator activators and the like may be suitably added within a range that does not impair the effect of the present invention.

The rubber composition of the present invention is obtained by blending a rubber component having the above-mentioned properties, silica and carbon black, a thermoplastic (novolac type) phenol resin, hexamethylenetetramine and the like in a specific amount, respectively, but the rubber composition has to have tan δ at 60° C., tan δ at 0° C., dynamic modulus E' at 30° C., and tensile stress at the time of extending 300% (M300) at 25° C. (RT: at room temperature) so as to be (1) tan δ (60° C.)$\leq$0.14, (2) tan δ (0° C.)$\geq$0.50, (3) dynamic modulus E' (30° C.)$\geq$1.2×$10^7$ Pa and (4) tensile stress at the time of extending 300% (M300) (25° C.)$\leq$9.5 Mpa, respectively. The above-mentioned tan δ at 0° C. and tan δ at 60° C. are loss tangent (loss factor) at the temperature of 0° C. and 60° C., and in conformity with JIS K6301. Moreover, the dynamic modulus E' at 30° C. and the tensile stress at the time of extending 300% (M300) at 25° C. are also in conformity with JIS K6301.

By making a rubber composition having tan δ at 60° C. of the above-mentioned (1), tan δ (60° C.)$\leq$0.14, the intended RR property can be attained.

Furthermore, by satisfying the above described three conditions, (2) tan δ (0° C.)≧0.50, (3) dynamic modulus E' (30° C.)≧1.2×10$^7$ pa and (4) tensile stress at the time of extending 300% (M300) (25° C.)≦9.5 Mpa, the intended WET braking performance and WET turning performance can be attained. For example, even if the above described conditions (2) and (3) are satisfied, if the M300 of the above described (4) is higher than being required, the WET turning performance may not be attained. Alternatively, even if the above described conditions (2) and (4) are satisfied, if the dynamic modulus E' of the above described (3) is too low, the intended WET braking performance and WET turning performance cannot be attained.

By satisfying these tan δ at 60° C., tan δ at 0° C., dynamic modulus E' at 30° C., and tensile stress at the time of extending 300% (M300) at 25° C. in the above described range, the intended rubber composition can be obtained.

If any of these properties of tan δ at 60° C., tan δ at 0° C., dynamic modulus E' at 30° C., and tensile stress at the time of extending 300% (M300) at 25° C. is out of the above described range, the intended rubber composition cannot be obtained, which is not desirable.

The pneumatic tire of the present invention can be obtained by using a rubber composition having respective characteristic values which comprises blending the above-mentioned rubber component, silica and carbon black, the thermoplastic (novolac type) phenol resin, hexamethylene-tetramine and the like in a specific amount, respectively, for at least a portion of the tire tread rubber which is brought into contact with the road surface.

According to the present invention, by adding a specific resin to a rubber composition blended with a specific silica and carbon black whose tan δ at 60° C. and tan δ at 0° C. are optimized, the tensile stress at the time of extending 300% (M300) at 25° C. do not become higher than being required, while tan δ at 60° C. and tan δ at 0° C. are maintained as they are and the dynamic modulus E' is secured. Namely, by securing the dynamic modulus E' and controlling the tensile stress M300 at a certain level or below, block rigidity can be secured against dynamic strain input, a uniform contact surface pressure of the block can be secured even at any slip ratio, a friction coefficient (μ) peculiar to the rubber composition of the present invention can be exerted and tan δ at 60° C. can be maintained at a certain level or below. Hence, a rubber composition for a tire tread which can keep the tire rolling resistance at a low level and a pneumatic tire in which the rubber composition is used for at least a portion of the tire tread rubber which is brought into contact with the road surface can be obtained.

EXAMPLES

The present invention shall be described in detail with reference to examples and comparative examples, but the present invention is by no means limited to these examples.

Examples 1 to 4, and Comparative Examples 1 to 7

The rubber compositions were prepared by kneading components according to the blending formula shown in Table 1 described below by means of a Banbury mixer, respectively.

With regard to the obtained respective rubber compositions, tan δ at 60° C., tan δ at 0° C., dynamic modulus E' at 30° C., and tensile stress (M300) at 25° C. (RT) were evaluated according to a measurement method described below.

Moreover, a pneumatic tire was prepared by using respective rubber compositions obtained above for the tire tread rubber (prototype tire: size 195/65 R15), and WET braking performance, WET turning performance and RR were evaluated according to the measurement method described below.

These results are shown in Table 1 below.

Evaluation of tan δ at 60° C., tan δ at 0° C. and Dynamic Modulus E' at 30° C.

They were evaluated in conformity with JIS K6301. A sample (thickness: 2 mm, width: 4.7 mm, length: 20 mm) was measured at a static load of 160 g, dynamic strain of 1% and a frequency of 52 Hz by means of a viscoelasticity spectrometer manufactured by Toyo Seiki Co..

Evaluation of Tensile Stress at the Time of Extending 300% (M300) at 25° C.

It was evaluated in conformity with JIS K6301.

Evaluation of WET Braking Performance

A braking distance was measured under the condition of running at 100 km/h and at the standard inner pressure for the car (ABS vehicle) two people on board. It was expressed as an index with the value of Comparative Example 1 being set at 100. The higher the numerical value, the better the WET braking performance.

Evaluation of WET Turning Property

When the feeling of driving on a wet circuit of PG (Proving Ground) was evaluated, the speed (turning speed) at which a test driver can drive (control) a car was expressed in terms of an index, wherein the value of Comparative Example 1 was set at 100. The higher the numerical value, the better the WET turning performance.

Evaluation of RR

A rotating drum having a steel smooth surface with an outer diameter of 1707.8 mm and a width of 350 mm was used, and a resistance value when running by inertia at a speed of 80 km/h which was reduced from a speed of 180 km/h under an inner pressure of 200 kpa and a load of 444 kg was designated as RR, and was expressed as an index with the value of Comparative Example 1 being set at 100. RR should be 100 or smaller, and the smaller the value, the less the fuel consumption.

TABLE 1

| | | Comparative Examples | | | | | | | Mixing unit (parts by weight) Examples | | | |
|---|---|---|---|---|---|---|---|---|---|---|---|---|
| | | 1 | 2 | 3 | 4 | 5 | 6 | 7 | 1 | 2 | 3 | 4 |
| Blending components | SBR1500 *1 | 50 | 50 | — | 50 | — | 50 | 50 | 50 | — | 50 | 50 |
| | Sol · SBR *2 | 50 | 50 | 100 | 50 | 100 | 50 | 50 | 50 | 100 | 50 | 50 |
| | Carbon black (N234) *3 | 25 | 25 | 25 | 40 | 40 | 10 | 20 | 25 | 25 | 20 | 10 |
| | Silica *4 | 25 | 25 | 25 | 40 | 40 | 40 | 20 | 25 | 25 | 20 | 40 |

TABLE 1-continued

|  |  | Comparative Examples | | | | | | | Mixing unit (parts by weight) Examples | | | |
|---|---|---|---|---|---|---|---|---|---|---|---|---|
|  |  | 1 | 2 | 3 | 4 | 5 | 6 | 7 | 1 | 2 | 3 | 4 |
|  | Silane coupling agent *5 | 2.5 | 2.5 | 2.5 | 4.0 | 4.0 | 4.0 | 2.0 | 2.5 | 2.5 | 2.0 | 4.0 |
|  | ZnO | 2 | 2 | 2 | 2 | 2 | 2 | 2 | 2 | 2 | 2 | 2 |
|  | Stearic acid | 1 | 1 | 1 | 1 | 1 | 1 | 1 | 1 | 1 | 1 | 1 |
|  | Antioxdant (6C) | 1 | 1 | 1 | 1 | 1 | 1 | 1 | 1 | 1 | 1 | 1 |
|  | vulcanizing agent (DM) *6 | 0.5 | 0.5 | 0.5 | 0.5 | 0.5 | 0.5 | 0.5 | 0.5 | 0.5 | 0.5 | 0.5 |
|  | (DPG) *6 | 0.5 | 0.5 | 0.5 | 0.5 | 0.5 | 0.5 | 0.5 | 0.5 | 0.5 | 0.5 | 0.5 |
|  | (NS) *6 | 0.5 | 0.5 | 0.5 | 0.5 | 0.5 | 0.5 | 0.5 | 0.5 | 0.5 | 0.5 | 0.5 |
|  | Sulfur | 1.5 | 2.5 | 1.5 | 1.5 | 1.5 | 1.5 | 1.5 | 1.5 | 1.5 | 1.5 | 1.5 |
|  | Resin *7 |  |  |  |  |  |  |  | 2.5 | 2.5 | 5 | 5 |
|  | Hexamethylene tetramine |  |  |  |  |  |  |  | 0.25 | 0.25 | 0.5 | 0.5 |
| Properties | tan δ (0° C.) | 0.55 | 0.54 | 0.70 | 0.52 | 0.70 | 0.55 | 0.56 | 0.50 | 0.65 | 0.52 | 0.55 |
|  | tan δ (60° C.) | 0.12 | 0.11 | 0.11 | 0.25 | 0.25 | 0.10 | 0.08 | 0.12 | 0.12 | 0.10 | 0.11 |
|  | E' (30° C.) (×$10^7$) | 1.0 | 1.3 | 1.1 | 1.35 | 1.45 | 0.9 | 0.8 | 1.3 | 1.40 | 1.30 | 1.35 |
|  | M300 (RT) (Mpa) | 9.0 | 12.0 | 9.5 | 9.5 | 9.0 | 10.0 | 9.0 | 9.0 | 9.4 | 9.5 | 9.0 |
| Evaluation | Wet braking performance | 100 | 110 | 110 | 110 | 120 | 105 | 95 | 120 | 125 | 120 | 120 |
|  | Wet turning performance | 100 | 95 | 100 | 105 | 120 | 110 | 98 | 120 | 125 | 115 | 125 |
|  | RR | 100 | 98 | 98 | 110 | 110 | 95 | 92 | 100 | 100 | 95 | 98 |

*1 to *7 in Table 1 are as follows.
*1: manufactured by JSR, emulsion polymerization SBR 1500
*2: manufactured by JSR, solution polymerization SBR SL574
*3: $N_2SA$; 126 $m^2/g$, DBP; 125 ml/100 g
*4: Nipsil VN3AQ (manufactured by Nippon Silica), $N_2SA$: 195 $m^2/g$,
*5: Si69 (manufactured by Degssa AG.) bis(3-triethoxysilylpropyl)tetrasulfide
*6: DM: dibenzothiazyldisulfide
DPG: diphenylguanidine
NS: N-t-butyl-2-benzothiazylsulfenamid
*7: Sumilite Resin No. PR-13349 (by Sumitomo Bakelite Company Ltd.) Melting point 73° C., oil modified phenol resin Consideration of the Above Table 1

As is obvious from the results shown in the above table 1, the examples that satisfy all the WET braking performance, WET turning performance and RR are Examples 1 to 4 which are within the scope of the present invention, and in Comparative Examples 1 to 7 which are outside the scope of the present invention, either two of the WET braking performance, WET turning performance and RR can be satisfied, but all of them cannot be satisfied.

It can be seen that the rubber compositions in Examples 1 to 4 are at a level satisfying tan δ at 0° C., tan δ at 60 ° C., E' at 30° C. and M300 at 25° C., and are excellent in the tire performance.

On the contrary, it can be understood that the rubber compositions in Comparatives 1, 3 and 7 are at a satisfactory level with regard to tan δ at 0° C., tan δ at 60° C. and M300, but since E' thereof is low, the WET braking performance or turning performance did not reach the intended level. It can be also seen that in Comparative Example 2 tan δ at 0° C., tan δ at 60° C. and E' are at a satisfactory level, but since M300 is high, the WET braking performance and turning performance did not reach the intended level.

It is seen that in Comparative Examples 4 and 5 tan δ at 0° C., E' and M300 are at a satisfactory level, but since tan δ at 60° C. is high, the RR did not reach an intended level.

It is seen that the rubber composition in Comparative Example 6 is at a level satisfying tan δ at 0° C. and tan δ at 60° C., but since E' thereof is low and M300 is high, the WET braking performance did not reach the intended level.

What is claimed is:

1. A rubber composition for a tire tread comprising:

per 100 parts by weight of a diene based rubber component containing at least 50 parts by weight of styrene-butadiene rubber, (1) 5 to 50 parts by weight of carbon black having a nitrogen absorption surface area of from 90 to 180 $m^2/g$ and an oil-absorbing amount of dibutylphthalate of from 100 to 170 ml/100 g;

(2) 5 to 50 parts by weight of silica, (3) wherein the total amount of said carbon black and silica is from 30 to 90 parts by weight; and (4) 5 to 20% by weight of a silane coupling agent relative to said blended amount of silica;

(5) 1 to 15 parts by weight of a thermoplastic phenol resin; and (6) 5 to 20% by weight of hexamethylenetetramine relative to the blended amount of resin, wherein tan δ at 60° C. of said rubber composition is ≦0.14, tan δ at 0° C. of said rubber composition is ≧0.50, dynamic modulus E' at 30° C. of said rubber composition is ≧1.2×$10^7$ pa, and tensile stress at the time of extending 300% at 25° C. of said rubber composition is ≦9.5 Mpa.

2. A rubber composition for a tire tread as described in claim 1, wherein the styrene-butadiene rubber is a solution polymerized styrene-butadiene rubber.

3. A rubber composition for a tire tread as described in claim 1, wherein the nitrogen absorption surface area ($N_2SA$) of carbon black is from 100 to 140 $m^2/g$ and the oil-absorbing amount of dibutylphthalate (DBP) is from 110 to 150 ml/100 g.

4. A rubber composition for a tire tread as described in claim 1, wherein the nitrogen absorption surface area ($N_2SA$) of silica is from 100 to 300 $m^2/g$.

5. A rubber composition for a tire tread as described in claim 1, wherein the thermoplastic phenol resin is an alkyl-substituted phenol resin.

6. A rubber composition for a tire tread as described in claim 1, wherein the thermoplastic phenol resin is an oil-modified phenol resin.

7. A pneumatic tire using the rubber composition for a tire tread as described in claim 1 for at least a portion of the tread rubber which is brought into contact with the road surface.

8. A pneumatic tire using the rubber composition for a tire tread as described in claim 2 for at least a portion of the tread rubber which is brought into contact with the road surface.

9. A pneumatic tire using the rubber composition for a tire tread as described in claim 3 for at least a portion of the tread rubber which is brought into contact with the road surface.

10. A pneumatic tire using the rubber composition for a tire tread as described in claim 4 for at least a portion of the tread rubber which is brought into contact with the road surface.

11. A pneumatic tire using the rubber composition for a tire tread as described in claim 5 for at least a portion of the tread rubber which is brought into contact with the road surface.

12. A pneumatic tire using the rubber composition for a tire tread as described in claim 6 for at least a portion of the tread rubber which is brought into contact with the road surface.

* * * * *